United States Patent
Yeh et al.

(10) Patent No.: US 10,778,814 B2
(45) Date of Patent: Sep. 15, 2020

(54) MULTI-FIELD CLASSIFIER

(71) Applicant: ROCKLEY PHOTONICS LIMITED, London (GB)

(72) Inventors: Chiang Yeh, Sierra Madre, CA (US); German Rodriguez Herrera, Oberengstringen (CH); Bhaskar Chowdhuri, San Diego, CA (US)

(73) Assignee: Rockley Photonics Limited, London (GB)

( * ) Notice: Subject to any disclaimer, the term of this patent is extended or adjusted under 35 U.S.C. 154(b) by 95 days.

(21) Appl. No.: 15/879,065

(22) Filed: Jan. 24, 2018

(65) Prior Publication Data

US 2018/0213067 A1    Jul. 26, 2018

Related U.S. Application Data

(60) Provisional application No. 62/450,003, filed on Jan. 24, 2017.

(51) Int. Cl.
*H04L 29/06* (2006.01)
*H04L 12/743* (2013.01)
*G06F 16/903* (2019.01)
*H04L 12/851* (2013.01)

(52) U.S. Cl.
CPC ........ *H04L 69/22* (2013.01); *G06F 16/90339* (2019.01); *H04L 45/7457* (2013.01); *H04L 47/2441* (2013.01)

(58) Field of Classification Search
None
See application file for complete search history.

(56) References Cited

U.S. PATENT DOCUMENTS

| | | |
|---|---|---|
| 6,778,530 B1 | 8/2004 | Greene |
| 7,002,965 B1 | 2/2006 | Cheriton |
| 7,116,663 B2 | 10/2006 | Liao |
| 7,554,980 B1 | 6/2009 | Yeh et al. |
| 7,872,993 B2 | 1/2011 | Bailey et al. |
| 8,503,428 B2 | 8/2013 | Bajaj et al. |
| 9,008,108 B2 | 4/2015 | Chinta et al. |
| 9,240,959 B2 | 1/2016 | Park et al. |

(Continued)

FOREIGN PATENT DOCUMENTS

WO    WO 2007/117891 A1    10/2007

OTHER PUBLICATIONS

International Search Report and Written Opinion of the International Searching Authority, dated Feb. 23, 2018, Corresponding to PCT/EP2018/051484, 17 pages.

(Continued)

*Primary Examiner* — Mohammad S Adhami
(74) *Attorney, Agent, or Firm* — Lewis Roca Rothgerber Christie LLP

(57) ABSTRACT

A system and method for classifying packets according to packet header field values. Each of a set of subkey tables is searched for a respective packet header field value; each such search results in a value for a subkey. The subkeys are combined to form a decision key. A decision table is then searched for the decision key. The search of the decision table results in an action code and a reason code, one or both of which may be used to determine how to further process the packet.

19 Claims, 2 Drawing Sheets

(56) References Cited

U.S. PATENT DOCUMENTS

| | | | | |
|---|---|---|---|---|
| 2007/0283144 | A1* | 12/2007 | Kramer | H04L 63/0263 |
| | | | | 713/164 |
| 2009/0080452 | A1* | 3/2009 | Ra | H04L 45/00 |
| | | | | 370/419 |
| 2014/0310307 | A1* | 10/2014 | Levy | H04L 45/7453 |
| | | | | 707/769 |
| 2015/0244842 | A1* | 8/2015 | Laufer | H04L 69/22 |
| | | | | 370/392 |
| 2016/0316045 | A1* | 10/2016 | Treves | H04L 69/22 |
| 2016/0335299 | A1* | 11/2016 | Vemulapati | G06F 16/2291 |
| 2018/0068032 | A1* | 3/2018 | Levy | H04L 45/7453 |

OTHER PUBLICATIONS

Srinivasan, V. et al., "Packet Classification Using Tuple Space Search", SIGCOMM 99, Sep. 3, 1999, 12 pages.

* cited by examiner

MULTI-FIELD CLASSIFIER

CROSS-REFERENCE TO RELATED APPLICATION(S)

The present application claims priority to and the benefit of U.S. Provisional Application No. 62/450,003, filed Jan. 24, 2017, entitled "MULTI-FIELD CLASSIFIER", the entire content of which is incorporated herein by reference.

FIELD

One or more aspects of embodiments according to the present invention relate to packet processing, and more particularly to a system and method for classifying data packets according to the values of fields in the packet headers.

BACKGROUND

Content-addressable memories (CAMs), or ternary content-addressable memories (TCAMs) may be used to classify data packets according to the values of fields in the packet headers. CAMs and TCAMs, however, are costly, e.g., in terms of the chip area such structures require.

Thus, there is a need for an improved system and method for classifying data packets.

SUMMARY

Aspects of embodiments of the present disclosure are directed toward a system and method for classifying packets according to packet header field values. Each of a set of subkey tables is searched for a respective packet header field value; each such search results in a value for a subkey. The subkeys are combined to form a decision key. A decision table is then searched for the decision key. The search of the decision table results in an action code and a reason code, one or both of which may be used to determine how to further process the packet.

According to an embodiment of the present invention there is provided a method for processing an n-tuple, the method including: searching a corresponding one, of n subkey classifying tables, for each of the elements of the n-tuple, each of the subkey classifying tables having a plurality of rows each having a respective criterion; generating, for each of the elements, from the subkey classifying table corresponding to the element, a subkey, the subkey: being equal to a value in the first row, of the subkey classifying table, for which the element satisfies the criterion, if the element satisfies the criterion of any of the rows in the subkey classifying table, and being equal to a reserved value, otherwise; combining the subkeys to form a decision key; and searching a decision classifying table for the decision key.

According to an embodiment of the present invention there is provided a method for classifying a packet including a header including a plurality of header fields, each having a respective value, the method including classifying the header utilizing the method for processing an n-tuple, with the n-tuple being a subset of the header field values.

In one embodiment, all of the subkey classifying tables have the same length.

In one embodiment, the length of each subkey classifying table is 64 rows.

In one embodiment, the combining of the subkeys to form the decision key includes concatenating the subkeys.

In one embodiment, n is greater than 4 and less than 12.

In one embodiment, a subkey classifying table of the n subkey classifying tables is a match-only classifying table.

In one embodiment, a subkey classifying table of the n subkey classifying tables is a range classifying table.

In one embodiment, the decision classifying table is a range classifying table.

According to an embodiment of the present invention there is provided a system for classifying packet headers, the system including: a plurality of subkey classifying table search circuits, each including a classifying table having a plurality of rows each having a respective criterion; and a decision classifying table search circuit, each subkey classifying table search circuit being configured: to receive a respective packet header field value, and to produce, as a respective search result, a respective subkey; and the decision classifying table search circuit being configured: to receive a combination of the search results from the subkey classifying table search circuits, and to produce, as a search result, an action code.

In one embodiment, the classifying table of a subkey classifying table search circuit of the subkey classifying table search circuits is a match-only classifying table; and the subkey classifying table search circuit is configured to return: an entry from a result column of a first row of the classifying table from which the packet header field value received by the subkey classifying table search circuit satisfies the criterion, when the packet header field value satisfies the criterion of any row of the classifying table, and a reserved value, otherwise.

In one embodiment, the classifying table of a subkey classifying table search circuit of the subkey classifying table search circuits is a range classifying table having a match column and a range column, each of the rows of the range classifying table having a match criterion; and the subkey classifying table search circuit is configured to return, when the packet header field value received by the subkey classifying table search circuit satisfies the criterion of any row of the range classifying table: an entry from a result column of the first row of the range classifying table for which the packet header field value satisfies the criterion, the entry being: an entry from a match column of the range classifying table, when the packet header field value satisfies the match criterion of the first row, and an entry from a range column of the range classifying table, otherwise; and when the packet header field value received by the subkey classifying table search circuit does not satisfy the criterion of any row of the range classifying table: a reserved value.

In one embodiment, a subkey classifying table search circuit of the subkey classifying table search circuits includes a plurality of stage circuits arranged in a pipeline, a stage circuit of the plurality of stage circuits being configured to: receive zero or more bits of an address of a current row, of the classifying table of the subkey classifying table search circuit, to be tested, as part of a binary search of the classifying table of the subkey classifying table search circuit, form the address of the current row by appending 1 to the zero or more bits, and padding the result with trailing zeros.

In one embodiment, each stage circuit is configured to produce, as output, one or more bits of an address, the one or more bits consisting of the zero or more bits received, followed by: a binary 1 if the packet header field value exceeds a pattern value of the current row, and a binary 0 if the packet header field value is less than a pattern value of the current row.

In one embodiment, a subkey classifying table search circuit of the subkey classifying table search circuits is configured to return a new subkey for each clock cycle of a plurality of consecutive clock cycles.

In one embodiment, the system includes a packet parsing circuit configured to receive a packet, and to produce, at n respective outputs, n being an integer greater than 1, n respective header field values from a header of the packet.

In one embodiment, the system includes an input first-in, first-out circuit having an output connected to an input of the packet parsing circuit.

In one embodiment, the system includes a concatenating circuit having: a plurality of inputs each connected to a respective one of the subkey classifying table search circuits; and an output connected to the decision classifying table search circuit, the concatenating circuit being configured to combine subkeys received from the subkey classifying table search circuits to form a decision key, and to send the decision key to the decision classifying table search circuit.

In one embodiment, the concatenating circuit is configured to combine the subkeys by concatenating the subkeys.

In one embodiment, the system includes an aligning first-in, first-out circuit having an input connected to one of the subkey classifying table search circuits and an output connected to the concatenating circuit.

BRIEF DESCRIPTION OF THE DRAWINGS

These and other features and advantages of the present invention will be appreciated and understood with reference to the specification, claims, and appended drawings wherein:

DETAILED DESCRIPTION

Figure 1:
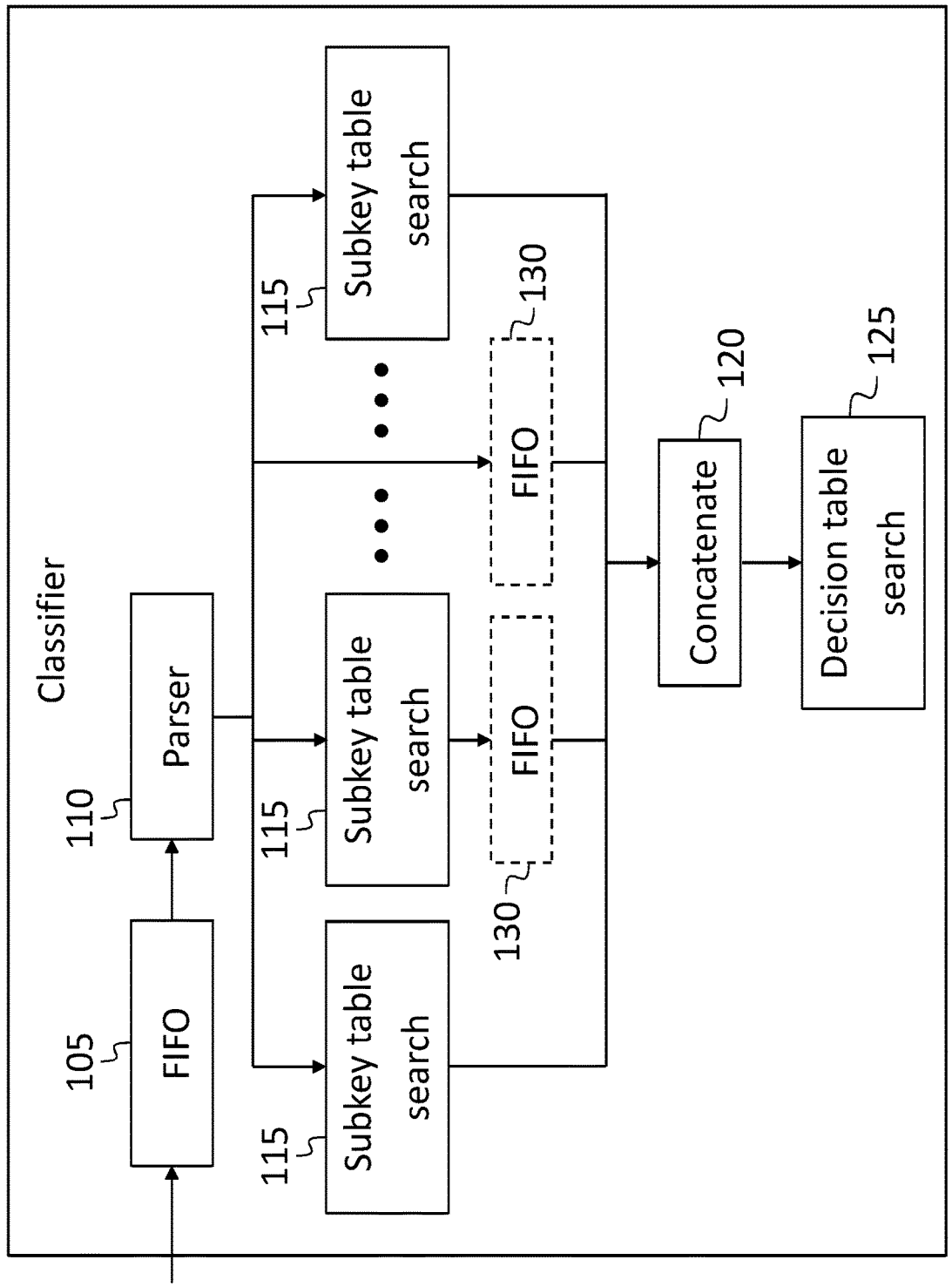
FIG. 1 is a block diagram of a packet classifier according to an embodiment of the present invention.

The detailed description set forth below in connection with the appended drawings is intended as a description of exemplary embodiments of a multi-field classifier provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The handling of data packets (e.g., Transmission Control Protocol/Internet Protocol (TCP/IP) packets) by a packet processing circuit may involve classifying the packets into different categories according to what action is to be taken with each packet. For example, it may be appropriate for the packet processing circuit (i) to drop layer 2 broadcast and multicast packets, (ii) to forward to a generic routing encapsulation circuit any packet having a header that specifies (a) an Ethernet type of Internet Protocol version 4 or version 6 and (b) Internet Group Management Protocol or Internet Control Message Protocol, and (iii) to forward packets to a longest prefix match circuit under various other circumstances. When a packet is forwarded to the generic routing encapsulation circuit, it may further be appropriate to provide, to the generic routing encapsulation circuit, a reason code, to facilitate the proper handling of the packet by the generic routing encapsulation circuit. The mapping of packet header field values to appropriate actions and reason codes may be complex, in part because of the relatively large number of possible combinations of header field values, and because the appropriate action to take when one field has a certain value may depend on the values of other fields in the same packet header.

In some embodiments, action codes (each identifying an appropriate action) and reason codes are generated, from an n-tuple of header field values, by a classifier using a two-stage process, as follows. The classification process is described herein with examples related to the classification of packet headers, but the invention is not limited to such applications, and the process may be employed in other applications. As used herein, an n-tuple is a sequence (or ordered list) of n elements, each element being a number, where n is a positive integer.

The classifier employs one or more data structures each referred to herein as a "classifying table" (or a "binary sort table"). A classifying table includes a plurality of cells arranged in rows and columns. The number of rows may be referred to as a the "length" of the table. In some embodiments each classifying table includes a column referred to as a "pattern" column, and one or more result columns. Each result column may be of a type referred to as a "match" column, or it may be of a type referred to as a "range" column. A classifying table including at least one range column may be referred to as a "range classifying table", and a classifying table lacking a range column may be referred to as a "match-only classifying table". The pattern column contains a set of values (e.g., values of the header field to which the table corresponds), in increasing order. As used herein, a "value" is a number, e.g., a signed or unsigned integer, or fixed point or floating point number. The entry in each cell of a match column or of a range column may be a single value, or it may be a tuple, e.g., a pair of values (a 2-tuple). The tables are stored in a way that allows for efficient exact-match and/or range searches, e.g., in increasing order or in decreasing order. The examples described herein generally assume that the tables are sorted in increasing order for the pattern column, but it will be understood that analogous embodiments may use decreasing order instead.

In operation, when the classifier searches for a value (referred to herein as a "search value") in the table, it performs a binary search for the value, and identifies the first row of the table for which the pattern value is greater than or equal to the search value. If the table contains no such row, the classifier returns a reserved value (or tuple) referred to herein as "not found". The classifier then returns the entry in the match column of the identified row, if the pattern value equals the search value. If the pattern value is greater than the search value, then (i) if the classifying table includes a range column, the classifier returns the entry in the range column of the identified row, or (ii) if the classifying table is a match-only classifying table, the classifier returns the reserved value ("not found"). The entry returned as a result of the search (or the reserved value, if it is returned) may be referred to as the "search result" or the "result of searching the classifying table". The row in which this result is found is referred to as the "first row" for which the search value satisfies the criterion for the row. A row that is adjacent to a row currently being tested is referred to as the row "preceding" the current row if its pattern value is smaller than that of the row currently being tested (or larger, if the patterns are sorted in decreasing order). As used herein, the "match criterion" of a row is said to be satisfied if the search value equals the pattern value, and the "range criterion" of a classifying table row is said to be satisfied if the search value exceeds the pattern value, (or, for a classifying table in which the patterns are sorted in decreasing order, if the search value is less than the pattern value). As used herein, the "criterion" of a classifying table row is the criterion that is satisfied if and only if either the match criterion or the range criterion for the row is satisfied. The term "first row" refers to the ordering of the patterns in the table; it will be understood that this may correspond to the row having the smallest address value or the largest address value depending on whether the patterns are stored in increasing or decreasing order, and whether the table is searched in order of increasing or decreasing pattern values.

In one embodiment, to classify packets, the classifier searches (in a first stage of the classifying process), a first set of eight classifying tables referred to as subkey tables (or subkey classifying tables), searching each subkey table for a respective header field value. The entries returned from the searches, which may be referred to as subkeys, are then concatenated to form a decision key. The classifier then (in a second stage of the classifying process), searches a classifying table referred to as the decision table (or the decision classifying table).The result returned by the classifier for this search is an action code and a reason code (i.e., the result is a 2-tuple); the reason code is only used when the action code identifies forwarding to the generic routing encapsulation circuit.

The operation of such a system may be illustrated with examples related to packet header classification. Each packet may include a header, which may include, e.g., eleven fields including the (48 bit) destination media access control (MAC) address (DMAC) address, the (48 bit) source MAC address, the (16 bit) Ethernet protocol type (EtherType or ETYPE), three multiprotocol label switching (MPLS) header fields (MPLS.LABEL, MPLS.EXP, MPLS.S), a (32-bit or 128 bit) internet protocol (IPv4 or IPv6) source address (SIP) (i.e., SIPV4 or SIPV6), a (32-bit or 128 bit) internet protocol (IPv4 or IPv6) destination address (DIP) (i.e., DIPV4 or DIPV6), an (8 bit) layer 3 (IP) protocol (PROTO), a (16 bit) source port (SPORT) and a (16 bit) destination port (DPORT). In some embodiments, eight of these fields are used for classification, e.g., the fields with abbreviated names DMAC, SMAC, ETYPE, SIP, DIP, PROTO, SPORT, and DPORT. The classifier may pad SIP or DIP values that are 32 bit values (i.e., IPv4 values) with zeros (e.g., leading zeros) to a width of 128 bits. The classifier searches for each of the header field values in a respective subkey table, and returns a respective subkey as a result of each search. Each subkey table has a length of 64 rows and each subkey is a 6-bit number. In some embodiments, each subkey value occurs only once in each subkey table (except the reserved value, 3F, which may occur multiple times). In other embodiments, a subkey value may occur more than once, and, in such a case, the classifier does not distinguish between the field values for which the returned subkey values are the same. The subkeys are concatenated to form a (48-bit) decision key, and the classifier searches the decision table for the decision key. The entries in the match column of the decision table (and in the range column of the decision table, if it has one) are pairs of values (i.e., 2-tuples) one of which identifies an action to be taken, and one of which identifies a reason. The length of the decision table may be selected to provide a number of rows sufficient for most applications, while not using an unacceptable amount of resources (e.g., chip area). In some embodiments the length of the decision table is 1024 rows.

Table 1 shows various possible 3-bit action codes that may identify an action to be taken. The actions include advancing to (i.e., forwarding the packet header to) a longest prefix match (LPM) (or "maximum prefix length match") block (or circuit), advancing to a generic routing encapsulation (GRE) block (or circuit), advancing to a source routing (SOURCEY) block (or circuit), or dropping the packet (DROP). The GRE block may be implemented in special-purpose hardware, or as set of instructions executed by a (general purpose) central processing unit (CPU).

TABLE 1

| Action Code | Action Name | Action Description |
|---|---|---|
| 0 | LPM | Advance to the LPM block |
| 1 | FWD_GRE | Advance to the GRE block |
| 2 | SOURCEY | Advance to the SOURCEY block |
| 3 | DROP | Drop the packet |
| 4-7 | Reserved | |

When the identified action is advancing to the generic routing encapsulation circuit, the tuple element (of the 2-tuple stored in the decision table) identifying a reason (or "reason code") may also be forwarded to the generic routing encapsulation block. Examples of reasons, and 8-bit codes that may be used to identify them, are shown in Table 2.

TABLE 2

| Reason Code | Reason Name |
|---|---|
| 0 | LLDP |
| 1 | IPV4_SUBNET_BCAST |
| 2 | IPV4_GLOBAL_BCAST |
| 3 | IPV4_MCAST |
| 4 | IPV6_MCAST |
| 5 | IGMP |
| 6 | ICMPV4 |
| 7 | ICMPV6 |
| 8 | BGP |
| 9-255 | RESERVED |

As used herein, any pair of characters that may be interpreted to represent a 2-digit (i.e., 8-bit) hexadecimal number represents such a number unless otherwise noted. The proper handling of each packet may depend on the values of some or all of the packet header fields. For example, if the DMAC is FF FF FF FF FF FF (i.e., FF:FF:FF:FF:FF:FF, in the notation customarily used for DMACs), then the packet is a layer 2 broadcast packet and it may be appropriate to drop the packet. Similarly, if first octet of the DMAC is 01 (regardless of the values of the other octets of the DMAC), then the packet is a layer 2 multicast packet and it may also be appropriate to drop the packet. Accordingly, the subkey table for the DMAC field may include the rows shown in Table 3, where 3F is the reserved "not found" value, and where the ellipsis " . . . " indicates zero or more rows the contents of which are not shown.

TABLE 3

| Pattern | Match | Range |
|---|---|---|
| 00 00 00 00 00 00 | 3F | 3F |
| 01 00 00 00 00 00 | 02 | 3F |
| 02 00 00 00 00 00 | 3F | 02 |
| ... | | |
| FF FF FF FF FF FF | 01 | 3F |

When the classifier searches the DMAC table shown in Table 3, with a DMAC value equal to FF FF FF FF FF FF, the subkey returned is 01. When the classifier searches the DMAC table shown in Table 3, with any DMAC value having a first octet equal to 01, the subkey returned is 02 (01 00 00 00 00 00 will satisfy the match criterion of the second row of Table 3, and any value between 01 00 00 00 00 00 01 and 01 FF FF FF FF FF, inclusive, will satisfy the range criterion, but not the match criterion, of the third row of Table 3). The decision table may then contain rows having the effect that these subkey values result in the packet being dropped, as discussed in further detail below.

The subkey table for the ETYPE header field may lack a range column; there may be little benefit to including such a column, the defined ETYPE values (with a few exceptions, such as MPLS and PPPoE related EtherTypes) not being organized in groups. The ETYPE subkey table may include the rows shown in Table 4, for example.

TABLE 4

| Pattern | Match |
|---|---|
| 08 00 | 03 |
| 86 DD | 05 |
| ... | |

Accordingly, an Internet Protocol version 4 (IPv4) packet (having an ETYPE field value of 08 00) will result in a ETYPE subkey value of 03 being returned, and an Internet Protocol Version 6 (IPv6) packet (having an ETYPE field value of 86 DD) will result in an ETYPE subkey value of 05 being returned.

Like the ETYPE subkey table, the subkey table for the PROTO header field may lack a range column. The PROTO subkey table may include the rows shown in Table 5, for example.

TABLE 5

| Pattern | Match |
|---|---|
| 01 | 04 |
| 02 | 03 |
| 3A | 05 |
| ... | |

Accordingly, a packet specifying an Internet protocol number of 01 (Internet Control Message Protocol (ICMP) for IPv4 (ICMPv4)) would result in a PROTO subkey of 04 being returned, a packet specifying a Internet protocol number of 02 (Internet Group Management Protocol (IGMP)) would result in a PROTO subkey of 03 being returned, a packet specifying a Internet protocol number of 3A (Internet Control Message Protocol for IPv6 (ICMPv6)) would result in a PROTO subkey of 05 being returned.

In some embodiments a table is omitted if the header packet field is smaller, the same size as, or slightly larger than the subkey that the table would store. For example, the PROTO table may be omitted (and the 8 bit PROTO field value used directly as a subkey, i.e., concatenated with the other subkeys) with some loss of performance and increase in chip area if the subkeys are 6-bit subkeys, and potentially with a small savings in chip area if the subkeys are 8-bit subkeys.

In some embodiments the decision table contains values such as those shown in Table 6. The pattern column of the decision table contains possible values of the decision key. As mentioned above, the 48-bit decision key is formed by concatenating the eight 6-bit subkey values. They may be concatenated in the following order, with DMAC being the most significant subkey portion: DMAC, SMAC, ETYPE, SIP, DIP, PROTO, SPORT, and DPORT. In Table 6, the subkeys that are concatenated to form this value are shown, for clarity, instead of the 48-bit value that results from the concatenation. Also for clarity, the names of the action and reason in each cell of range and match columns are listed, instead of the numerical codes. Cells in which a hyphen ("-") is shown are ones in which the table may contain any value because the value is not used. The values in the cells that are blank may be determined by other rows of the table the contents of which are not shown.

TABLE 6

| | | Match | | Range | |
|---|---|---|---|---|---|
| | Pattern (key) | Action | Reason | Action | Reason |
| 1 | ... | | | | |
| 2 | 01 00 00 00 00 00 00 00 | DROP | — | | |
| 3 | 02 00 00 00 00 00 00 00 | DROP | — | DROP | — |
| 4 | 03 00 00 00 00 00 00 00 | | | DROP | — |
| 5 | ... | | | | |
| 6 | 3F 3F 03 3F 3F 03 00 00 | FWD_GRE | IGMP | | |
| 7 | 3F 3F 03 3F 3F 04 00 00 | FWD_GRE | ICMPv4 | FWD_GRE | IGMP |
| 8 | 3F 3F 03 3F 3F 05 00 00 | FWD_GRE | ICMPv6 | FWD_GRE | ICMPv4 |
| 9 | 3F 3F 03 3F 3F 06 00 00 | | | FWD_GRE | ICMPv6 |
| 10 | ... | | | | |

Row numbers to the left of the table are shown for purposes of identifying the rows only; these row numbers are not part of the table. Assuming that the criterion of any row preceding row 2 is not satisfied, then the contents of rows 2 and 3 cause any packet having a DMAC subkey value of 01 (indicating a layer 2 broadcast packet) to be dropped (such packets either satisfy the match criterion of row 2, or the range criterion (but not the match criterion) of row 3). If the criteria of no row preceding row 3 are satisfied, then the contents of rows 3 and 4 cause any packet having a DMAC subkey value of 02 (indicating a layer 2 multicast packet) to be dropped (such packets either satisfy the match criterion of row 3, or the range criterion (but not the match criterion) of row 4).

Similarly, if the criteria of no row preceding row 6 are satisfied, then the contents of rows 6 and 7 cause any packet having a ETYPE subkey value of 03 (indicating an ETYPE of 08 00, which identifies an ETYPE of IPv4) having SIP and DIP subkeys of 3F and a PROTO subkey of 03 (indicating an Internet protocol number of 02, which identifies IGMP) to be forwarded to the GRE circuit, with a reason code of IGMP. If the criteria of no row preceding row 7 are satisfied, then the contents of rows 7 and 8 cause any packet having a ETYPE subkey value of 03 (indicating an ETYPE of 08 00, which identifies an ETYPE of IPv4) having SIP and DIP subkeys of 3F and a PROTO subkey of 04 (indicating an Internet protocol number of 01, which identifies ICMP for IPv4) to be forwarded to the GRE circuit, with a reason code of ICMPv4. If the criteria of no row preceding row 8 are satisfied, then the contents of rows 8 and 9 cause any packet having a ETYPE subkey value of 05 (indicating an ETYPE of 08 DD, which identifies an ETYPE of IPv6) having SIP and DIP subkeys of 3F and a PROTO subkey of 05 (indicating an Internet protocol number of 3A, which identifies ICMP for IPv6) to be forwarded to the GRE circuit, with a reason code of ICMPv6.

As is apparent from the examples described above, the use of a range classifying table results in the order of concatenation establishing an order of priority for the subkeys. In the example of Tables 3-6, a packet with a DMAC having 01 as the leading octet will be dropped regardless of the values of its other packet header fields (assuming there are no rows preceding row 2 of Table 6 that specify different behavior). This characteristic may be useful for resolving conflicts between the decision rules of different packet header fields. Which of the header fields are included, and the order in which they are concatenated, may be programmable by writing appropriate values to a set of registers of the classifier. For example, eight such registers may be present, one corresponding to each of the eight subkeys. Each register may contain the position at which the subkey is to be included in the decision key, or a reserved value (e.g., 0, or −1 (in twos-complement form)) when a subkey is to be excluded. To include all 8 subkeys in the order in which the corresponding header fields appear in the header, for example, the registers may contain the values 1, 2, 3, . . . 8; to include all 8 subkeys in the reverse order, the registers may contain the values 8, 7, 6, . . . 1.

In some embodiments, a classifier using tables as described herein may be implemented in digital circuitry as a pipelined design suitable for classifying one packet per clock cycle, with a small number of clock cycles of latency. Referring to FIG. 1, such a classifier may include, at its input, an input first-in, first-out circuit (FIFO) 105, feeding a packet parsing circuit 110, which in turn feeds respective packet header field values to each of a plurality of subkey table searching circuits 115. The packet parsing circuit 110 may, for example, extract, from the packet header, the eight header field values to be used. The input FIFO 105 may be a synchronizing FIFO used to buffer the packet arriving from the media access controller while the packet parsing circuit operates. The outputs of the subkey table searching circuits 115 may be concatenated, by a concatenating circuit 120, to form the decision key, which may be fed to a decision table searching circuit 125. If the subkey tables are not all of equal length, an additional first-in, first-out circuit, which may be referred to as "aligning" FIFO 130, may be present at the output of any subkey table searching circuit 115 that is configured to search a shorter subkey table (i.e., a subkey table having a smaller length) than the longest subkey table and that completes its search in a smaller number of clock cycles than the subkey table searching circuits 115 that searches the longest table. Such aligning FIFOs 130 may ensure that the subkeys concatenated to form the decision key all originate from the same packet header. An aligning FIFO may also be used in place of a subkey table search circuit 115 if the corresponding header field is sufficiently short that the subkey table search circuit 115 may be omitted, and the header field used directly as a subkey. Each of the subkey table searching circuits 115 and the decision table searching circuit 125 may include (or, equivalently, be connected to) a respective classifying table, which may be a memory or a portion of a memory, programmed with the values of the classifying table.

Figure 2:
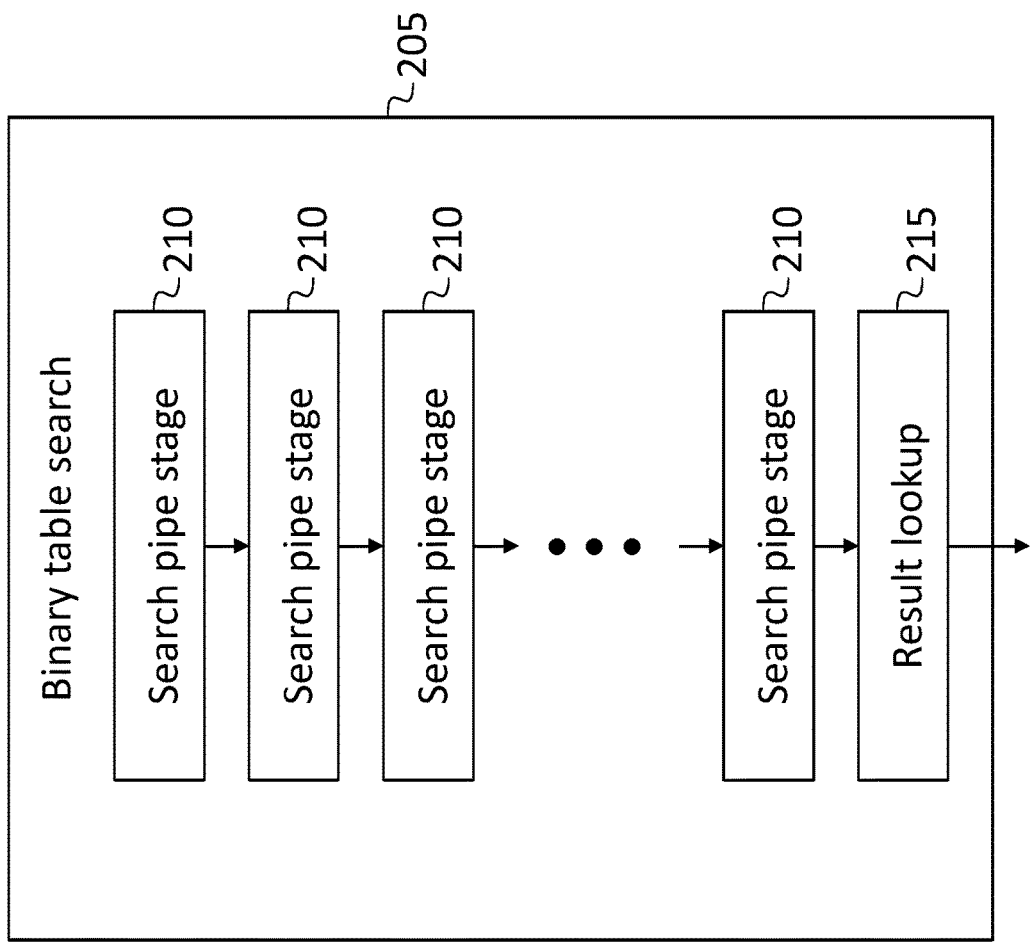
FIG. 2 is a block diagram of a pipelined binary classifying table search circuit, according to an embodiment of the present invention.

Each of the subkey table searching circuits 115, 125 may be implemented as an instance of a pipelined binary table search circuit 205, illustrated, for one embodiment, in FIG. 2. The binary table search circuit 205 may include a pipeline of search pipe stage circuits 210 that are used to find the "identified row", i.e., first row of the table for which the pattern value is greater than or equal to the search value. In some embodiments, each search pipe stage circuit 210 performs a successive test of the binary search i.e., it compares the pattern value of one row (the "current row") of the classifying table to the search value being searched for, and passes its result on to the next search pipe stage circuit 210. Each search pipe stage circuit 210 receives, as input, zero or more bits, beginning with the most significant bit, of the address of the identified row (as determined by the preceding search pipe stage circuits 210, if any). The output of each search pipe stage circuit 210 includes (i) a flag indicating whether a match was found (i.e., whether the search value equals the pattern value in the current row) and (ii) one or more bits of the address of the identified row.

For example, the first search pipe stage circuit 210 may test a row at the center of the table (e.g., for a 64 row table, having a 6-bit binary address of 100000). If the search value is greater than the pattern value, the first search pipe stage circuit 210 outputs a binary value of 1 as the most significant bit of the identified row, and if the search value is less than the pattern value, it outputs a binary value of 0 as the most significant bit of the identified row. The next (second) search pipe stage circuit 210 then appends a 1 to the received bit and pads the remainder of the address with zeros to form the address of the current row (so that the address if 110000 if it received a 1, and 010000 if it received a zero). In this stage, if the pattern value exceeds the search value, it forwards binary 11 to the next search pipe stage circuit 210 (as the first two bits of the identified row), and if the pattern value is less than the search value, it forwards binary 10 to the next search pipe stage circuit 210. In this manner, when a match is not yet found, each of the search pipe stage circuits 210 appends one bit to the address bits received from the preceding stage, the value of the bit depending on whether the search value is greater than or less than the pattern value in the current row. If any one of the search pipe stage circuits 210 finds that the search value equals the pattern value, it sets to true (e.g., to binary 1) the flag indicating whether a match was found, and outputs the entire address of the current row; each the remaining search pipe stage circuits 210 then simply passes this address value on to the next stage. The final search pipe stage circuit 210 of the pipeline sends its output to a result lookup circuit 215, which generates, as output, as appropriate (i) the value of the match column of the identified row, (ii) the reserved value (indicating "not found"), or (iii) the value of the range column of the identified row (if a range column is present, and if it is appropriate to return the value of the range column of the identified row). Each of the search pipe stage circuits 210 may complete its processing in one clock cycle, so that the binary table search circuit 205 may operate at the full clock rate, i.e., it may return a new subkey (corresponding to a different packet header) with each clock cycle.

The number of search pipe stage circuits 210 in the binary table search circuit 205 may be the smallest integer greater than or equal to the logarithm, to the base 2, of the length of the table being searched (i.e., of the number of rows in the table being searched). Accordingly, the latency of the classifier of FIG. 1 may be approximately ceil[log(M)]+ceil[log(N)] clock cycles, where M is the length of the longest subkey table, N is the length of the decision table, log( ) is a function that returns the logarithm to the base 2 of its argument, and ceil( ) is a function that returns the smallest integer greater than or equal to its argument.

It will be understood that the embodiments described herein may be modified without departing from the scope and spirit of the present invention. For example, there may be more or fewer than eight subkey tables, the classifier may be used for tasks other than classifying packet headers, the classifying tables may be sorted in decreasing order (in the pattern column) instead of increasing order, or not sorted (e.g., for small match-only classifying tables, in which, e.g., a linear search may be used instead of a binary search). The subkey tables need not all have the same length (and, accordingly, the subkeys need not all have the same bit width). The decision table may be a match-only classifying table. More than two stages of tables may be used, for some classifying problems, e.g., the value fed to each subkey subkey table searching circuit may be formed by concatenating results from a respective set of sub-subkey table searching circuits. As used herein, a "subset" (of a set) is either the entire set or a proper subset of the set.

Although exemplary embodiments of a multi-field classifier have been specifically described and illustrated herein, many modifications and variations will be apparent to those skilled in the art. Accordingly, it is to be understood that a multi-field classifier constructed according to principles of this invention may be embodied other than as specifically described herein. The invention is also defined in the following claims, and equivalents thereof.

What is claimed is:

1. A method for classifying a packet including a header comprising a plurality of header fields, each having a respective value, the method comprising:
    searching, by a packet processing circuit, a corresponding one, of n subkey classifying tables, for each of the elements of an n-tuple, each of the subkey classifying tables having a plurality of rows each having a respective criterion, the n-tuple being a subset of the header field values;
    generating, by the packet processing circuit, for each of the elements, from the subkey classifying table corresponding to the element, a subkey, the subkey:
        being equal to a value in the first row, of the subkey classifying table, for which the element satisfies the criterion, if the element satisfies the criterion of any of the rows in the subkey classifying table, and
        being equal to a reserved value, otherwise;
    combining, by the packet processing circuit, the subkeys to form a decision key;
    searching, by the packet processing circuit, a decision classifying table for the decision key; and
    taking an action, by the packet processing circuit, in response to an action code in a row of the decision classifying table matching the decision key, the action being selected, according to the action code, from the group consisting of:
        dropping the packet,
        forwarding the packet to a generic routing encapsulation circuit, and
        forwarding the packet to a longest prefix match circuit.

2. The method of claim 1, wherein all of the subkey classifying tables have the same length.

3. The method of claim 2, wherein the length of each subkey classifying table is 64 rows.

4. The method of claim 1, wherein the combining of the subkeys to form the decision key comprises concatenating the subkeys.

5. The method of claim 1, wherein n is greater than 4 and less than 12.

6. The method of claim 1, wherein a subkey classifying table of the n subkey classifying tables is a match-only classifying table.

7. The method of claim 1, wherein a subkey classifying table of the n subkey classifying tables is a range classifying table.

8. The method of claim 1, wherein the decision classifying table is a range classifying table.

9. A packet processing circuit for classifying a packet including a header, the header comprising a plurality of header fields, each having a respective value, the packet processing circuit comprising:
    a plurality of subkey classifying table search circuits, each comprising a classifying table having a plurality of rows each having a respective criterion; and
    a decision classifying table search circuit,
    each subkey classifying table search circuit being configured:
        to receive a respective packet header field value, and
        to produce, as a respective search result, a respective subkey; and
    the decision classifying table search circuit being configured:
        to receive a combination of the search results from the subkey classifying table search circuits, and
        to produce, as a search result, an action code,
    wherein the packet processing circuit is configured to take an action, in response to the action code, the action being selected, according to the action code, from the group consisting of:
        dropping the packet,
        forwarding the packet to a generic routing encapsulation circuit, and
        forwarding the packet to a longest prefix match circuit.

10. The packet processing circuit of claim 9, wherein:

the classifying table of a subkey classifying table search circuit of the subkey classifying table search circuits is a match-only classifying table; and the subkey classifying table search circuit is configured to return:

an entry from a result column of a first row of the classifying table from which the packet header field value received by the subkey classifying table search circuit satisfies the criterion, when the packet header field value satisfies the criterion of any row of the classifying table, and a reserved value, otherwise.

11. The packet processing circuit of claim 9, wherein:

the classifying table of a subkey classifying table search circuit of the subkey classifying table search circuits is a range classifying table having a match column and a range column, each of the rows of the range classifying table having a match criterion; and the subkey classifying table search circuit is configured to return, when the packet header field value received by the subkey classifying table search circuit satisfies the criterion of any row of the range classifying table: an entry from a result column of the first row of the range classifying table for which the packet header field value satisfies the criterion, the entry being:

an entry from a match column of the range classifying table, when the packet header field value satisfies the match criterion of the first row, and an entry from a range column of the range classifying table, otherwise; and when the packet header field value received by the subkey classifying table search circuit does not satisfy the criterion of any row of the range classifying table: a reserved value.

12. The packet processing circuit of claim 9, wherein a subkey classifying table search circuit of the subkey classifying table search circuits comprises a plurality of stage circuits arranged in a pipeline, a stage circuit of the plurality of stage circuits being configured to:

receive zero or more bits of an address of a current row, of the classifying table of the subkey classifying table search circuit, to be tested, as part of a binary search of the classifying table of the subkey classifying table search circuit, form the address of the current row by appending 1 to the zero or more bits, and padding the result with trailing zeros.

13. The packet processing circuit of claim 12, wherein each stage circuit is configured to produce, as output, one or more bits of an address, the one or more bits consisting of the zero or more bits received, followed by:

a binary 1 if the packet header field value exceeds a pattern value of the current row, and a binary 0 if the packet header field value is less than a pattern value of the current row.

14. The packet processing circuit of claim 12, wherein a subkey classifying table search circuit of the subkey classifying table search circuits is configured to return a new subkey for each clock cycle of a plurality of consecutive clock cycles.

15. The packet processing circuit of claim 9, further comprising a packet parsing circuit configured to receive a packet, and to produce, at n respective outputs, n being an integer greater than 1, n respective header field values from a header of the packet.

16. The packet processing circuit of claim 15, further comprising an input first-in, first-out circuit having an output connected to an input of the packet parsing circuit.

17. The packet processing circuit of claim 9, further comprising a concatenating circuit having:

a plurality of inputs each connected to a respective one of the subkey classifying table search circuits; and an output connected to the decision classifying table search circuit, the concatenating circuit being configured to combine subkeys received from the subkey classifying table search circuits to form a decision key, and to send the decision key to the decision classifying table search circuit.

18. The packet processing circuit of claim 17, wherein the concatenating circuit is configured to combine the subkeys by concatenating the subkeys.

19. The packet processing circuit of claim 17, further comprising an aligning first-in, first-out circuit having an input connected to one of the subkey classifying table search circuits and an output connected to the concatenating circuit.

* * * * *